US011387057B2

(12) United States Patent
Stockton et al.

(10) Patent No.: US 11,387,057 B2
(45) Date of Patent: Jul. 12, 2022

(54) TOGGLE SELECTOR SWITCH

(71) Applicant: Bugeye Technologies, Inc., Union, MO (US)

(72) Inventors: Michael E. Stockton, Bland, MO (US); Richard W. Homeyer, St. James, MO (US); Adam L. Marquart, Ballwin, MO (US)

(73) Assignee: BUGEYE TECHNOLOGIES, INC., Union, MO (US)

( * ) Notice: Subject to any disclaimer, the term of this patent is extended or adjusted under 35 U.S.C. 154(b) by 0 days.

(21) Appl. No.: 17/339,480

(22) Filed: Jun. 4, 2021

(65) Prior Publication Data

US 2022/0028636 A1    Jan. 27, 2022

Related U.S. Application Data

(60) Provisional application No. 63/054,647, filed on Jul. 21, 2020.

(51) Int. Cl.
| | | |
|---|---|---|
| *H01H 13/14* | (2006.01) | |
| *H01H 23/20* | (2006.01) | |
| *H01H 23/16* | (2006.01) | |
| *G09B 9/08* | (2006.01) | |

(52) U.S. Cl.
CPC ............ *H01H 23/205* (2013.01); *G09B 9/08* (2013.01); *H01H 13/14* (2013.01); *H01H 23/162* (2013.01)

(58) Field of Classification Search
CPC .... H01H 23/205; H01H 13/14; H01H 23/162; H01H 13/48; H01H 2205/016; H01H 2215/004; H01H 2227/022; H01H 25/008; H01H 25/04; H01H 13/705; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; G09B 9/08

See application file for complete search history.

(56) References Cited

U.S. PATENT DOCUMENTS

| | | | | |
|---|---|---|---|---|
| 3,867,591 | A * | 2/1975 | Nordeen ................. | H01H 21/26 200/332 |
| 3,980,852 | A * | 9/1976 | Redfield ............... | H01H 9/0207 200/38 B |
| 5,786,743 | A * | 7/1998 | Viscogliosi .......... | H01H 85/306 337/267 |
| 2018/0130615 | A1* | 5/2018 | Zhu ......................... | H01H 5/14 |

* cited by examiner

*Primary Examiner* — Ahmed M Saeed
(74) *Attorney, Agent, or Firm* — Sandberg Phoenix & von Gontard P.C.

(57) ABSTRACT

A toggle selector switch includes an activator stylus mounted in a housing to be pivotable about at least one axis. The toggle selector switch further includes at least one pushbutton switch positioned axially in the housing to be engaged when the elongate activator stylus is pivoted. The at least one pushbutton switch includes a mounting base including a contact and a first electrically conductive dome coupled to the mounting base. The first electrically conductive dome is positioned above the contact and is adapted and configured to flex under an applied force and to then touch the contact to complete a circuit and to return when the force is withdrawn. The activator stylus and the at least one pushbutton switch are adapted and configured such that the pushbutton switch outputs a signal indicating that the activator stylus has been moved in one of four directions.

20 Claims, 5 Drawing Sheets

TOGGLE SELECTOR SWITCH

CROSS-REFERENCE TO RELATED APPLICATIONS

This application claims the benefit of U.S. Provisional Application No. 63/054,647, filed Jul. 21, 2020, which is entitled "Toggle Selector Switch" and which is incorporated herein by reference in its entirety.

STATEMENT REGARDING FEDERALLY SPONSORED RESEARCH

Not Applicable.

BACKGROUND

The present disclosure relates to a toggle selector switch and methods of manufacturing the same.

Toggle selector switches are typically included in flight control systems or flight simulator flight control systems. Toggle selector switches allow a user to provide input to a system to select different functions, interact with a computer system, control a computer graphical user interface, and/or otherwise control a system.

Typical toggle selector switches have fixed properties such as the number of axes of input, the input force required for the toggle to register an input, and/or other properties. The fixed nature of these properties makes it difficult to tailor a typical toggle selector switch to particular uses. For example, a toggle selector switch that is appropriate for simulating one aircraft may not be appropriate for simulating another aircraft (e.g., due to a lack of force required for toggle selector activation). To simulate a different aircraft, replacement of the toggle selector switch or substantial modification of the toggle selector switch (e.g., such as machining of one or more components) is typically required.

BRIEF SUMMARY OF THE DISCLOSURE

Briefly, a toggle selector switch and method of manufacturing the same is disclosed that provides for an improved toggle selector switch. The toggle selector switch disclosed herein allows for customizable input forces and ease of modification.

In one embodiment, a toggle selector switch includes a housing having a top surface and a side wall, an activator stylus mounted in the housing to be pivotable about at least one axis and having an elongate stem, and a base plate at a bottom end of the stem and a striker extending generally perpendicularly from the stem. The toggle selector switch further includes at least one pushbutton switch mounted in the housing, the pushbutton switch being positioned axially in the housing to be engaged by the striker when the elongate activator stylus is pivoted. The toggle selector switch further includes a spring supported in the housing, the base plate of the stem engaging the spring, whereby the spring will center the activator stylus on a central axis when a force applied to the stylus is removed. The at least one pushbutton switch includes a mounting base including a contact and a first electrically conductive dome coupled to the mounting base. The first electrically conductive dome is positioned above the contact, and the first electrically conductive dome is normally spaced from the contact. The first electrically conductive dome is adapted and configured to flex under an applied force and to then touch the contact to complete a circuit and to return when the force is withdrawn. The activator stylus and the at least one pushbutton switch are adapted and configured such that a user can manipulate the activator stylus and depress the first conductive dome of the at least one pushbutton switch such that a circuit is completed between the contact and the first electrically conductive dome of the pushbutton switch and the pushbutton switch outputs a signal indicating that the activator stylus has been moved in the one of four directions.

In another embodiment, a push button switch comprises a mounting base including a contact, a first electrically conductive dome, and a second electrically conductive dome. The first electrically conductive dome is coupled to the mounting base and positioned above the contact. The first electrically conductive dome is normally spaced from the contact, and the first electrically conductive dome is adapted and configured to flex under an applied force and to then touch the contact to complete a circuit and to return when the force is withdrawn. The second electrically conductive dome is positioned above the first electrically conductive dome, and the second electrically conductive dome is adapted and configured to increase the force required to bring the first electrically conductive dome into contact with the contact.

DESCRIPTION OF THE DRAWINGS

In the accompanying drawings which form part of the specification.

DETAILED DESCRIPTION

Figure 1:
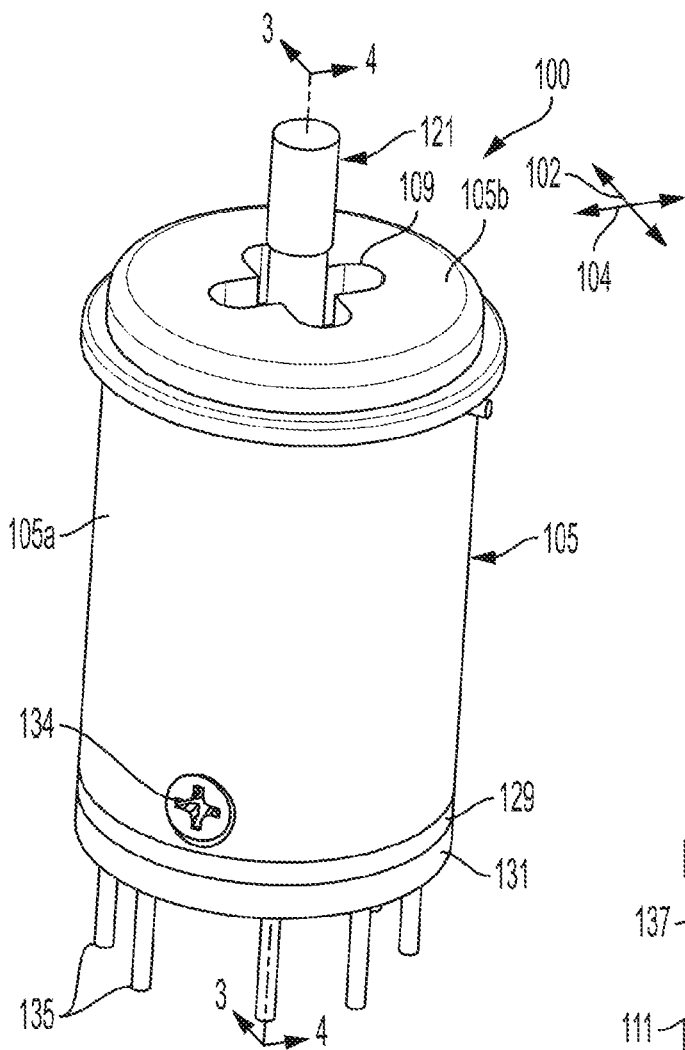
FIG. 1 is a perspective view of a toggle switch.
Figure 2:
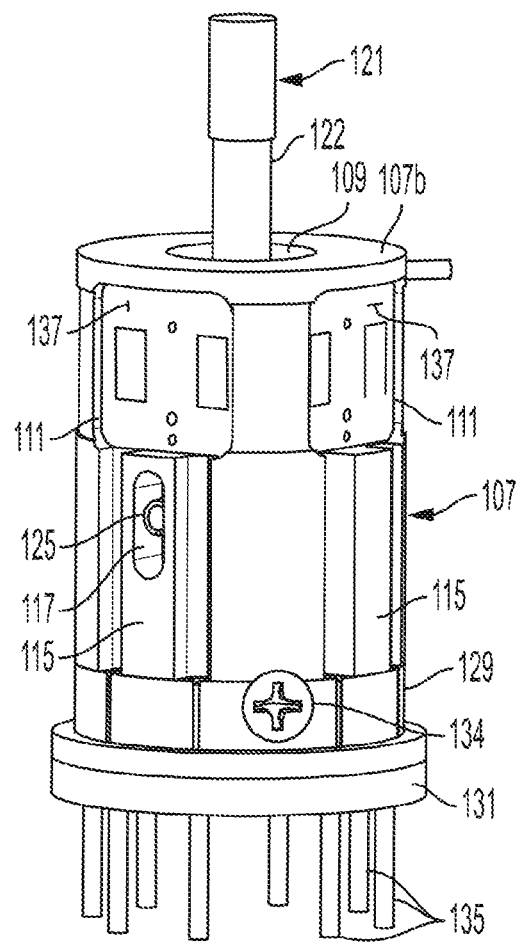
FIG. 2 is an elevational view of the toggle switch, with a housing of the toggle switch removed.

The following detailed description illustrates the disclosed apparatuses and processes by way of example and not by way of limitation. The description enables one skilled in the art to make and use the disclosed toggle selector switch, describes several embodiments, adaptations, variations, alternatives, and uses of the toggle selector switch, including what is presently believed to be the best mode of making and using the toggle selector switch. Additionally, it is to be understood that the toggle selector switch is not limited in its application to the details of construction and the arrangements of components set forth in the following description or illustrated in the drawings. The toggle selector switch is capable of other embodiments and of being practiced or being carried out in various ways. Also, it is to be understood that the phraseology and terminology used herein is for the purpose of description and should not be regarded as limiting.

A first illustrative embodiment of a toggle selector switch 100 is shown generally in FIGS. 1-4. Generally, the toggle selector switch 100 is adapted and configured to allow for the toggle selector switch 100 to be more easily tailored to particular uses. The toggle selector switch 100 is modifiable to change the force required to provide an input using the toggle. This allows for the toggle selector switch 100 to be tailored to particular uses. For example, the toggle selector switch 100 may be modified to be appropriate for simulating a variety of aircraft (e.g., by changing the toggle selector activation force).

The toggle selector switch 100 is a 4-way switch that allows for four selections across two axes 102, 104 (e.g., forward, backward, left, and right). The selector 100 comprises a housing 105 comprising a cylindrical wall 105a and a cover 105b at the top of the housing. The housing 105 is open at its bottom. The cover 105b has a +-shaped slot 109 formed centrally therein. The cover is preferably molded as a unitary piece, but can be formed as two pieces if desired.

Figure 3:
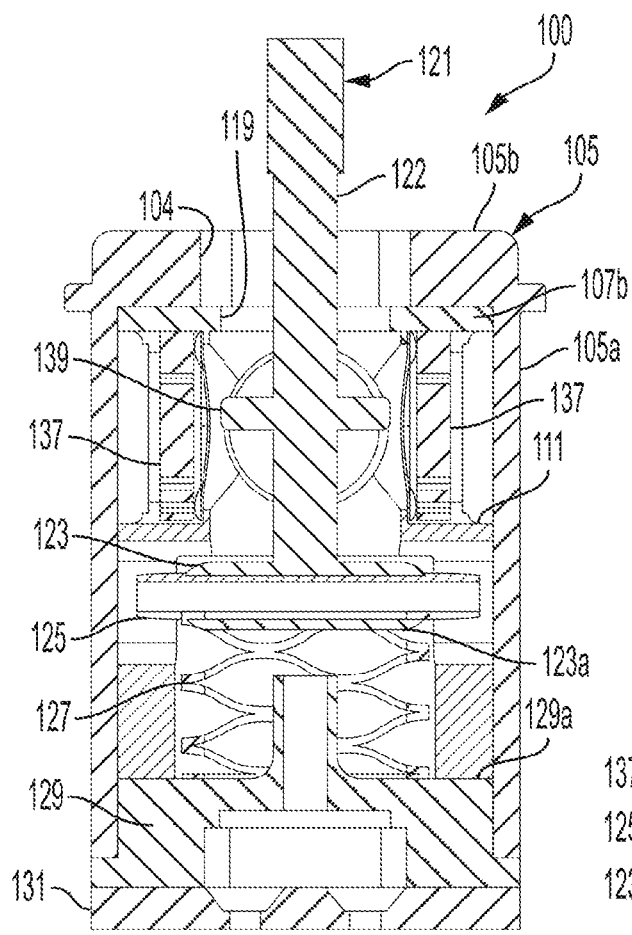
FIG. 3 is a cross-sectional view of the toggle switch taken along line 3-3 of FIG. 1.
Figure 4:
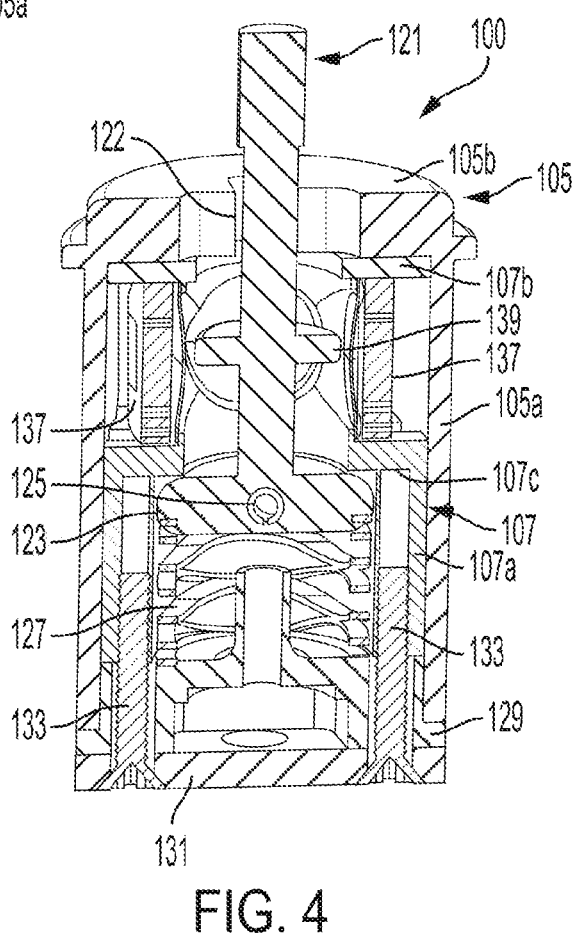
FIG. 4 is a cross-sectional view of the toggle switch taken along line 4-4 of FIG. 1, and at 90 degrees relative to the cross-section of FIG. 3.
Figure 5:
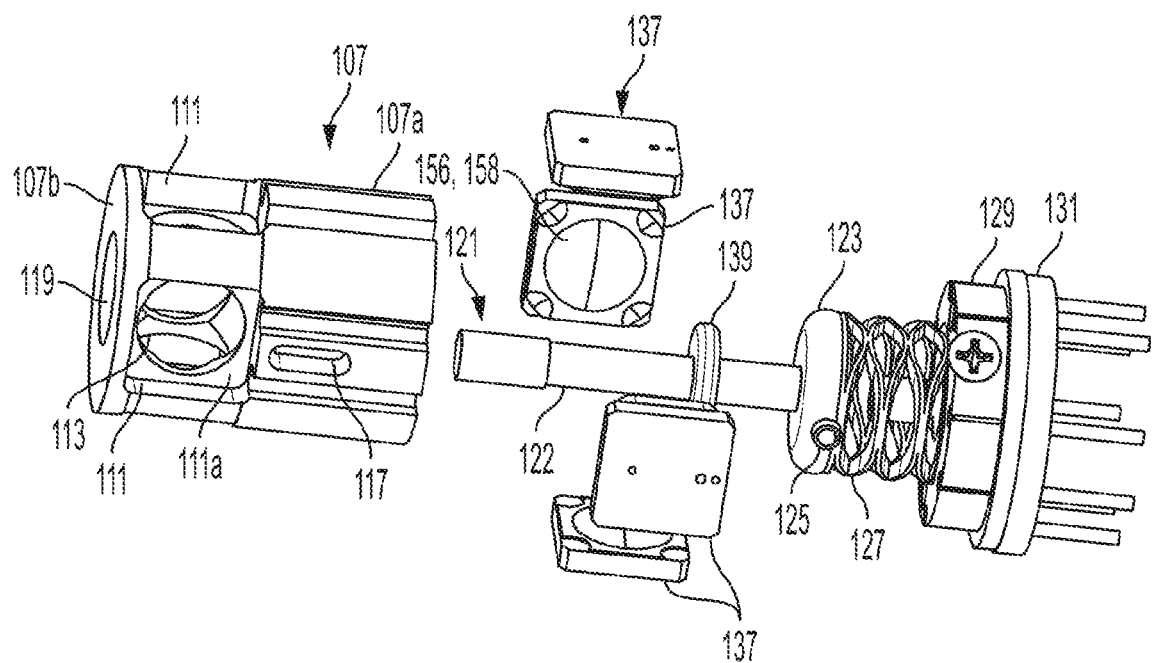
FIG. 5 is an exploded view of the toggle switch less the housing.

An inner housing member 107 comprising a side wall 107a and a top 107b is received within the housing. The inner housing 107 is hollow and defines an interior surface that is preferably circular in cross-section. As seen in FIGS. 3 and 4, the inner housing member is positioned to be adjacent the bottom surface of the housing top 105b. Four, generally square depressions 111 are formed in the outer surface of the inner housing. The depressions 111 have a depth less than the width of the inner housing wall 107a and an opening 113 is associated with each depression 111 which opens into the interior of the inner housing 107. An inner surface 111a of each depression surrounds each opening 113. An elongate rib 115 protrudes from the outer surface of the side wall 107a beneath each of the depressions 111. The ribs 115 extend from the bottom of the depressions to the bottom of the inner housing 107, and serve as spacers to properly position the inner housing 107 within the housing 105, and to reduce the amount of material needed to produce the inner housing 107. Elongate slots 117 are formed in two opposing ribs. Internally, the inner housing has a flange 107c extending inwardly just below the bottom of the depressions 111. An upper circular opening 119 is formed in the top 107b.

An elongate activator stylus 121 is mounted in the inner housing to be pivotable about both axes 102 and 104. The activator stylus 121 extends upwardly through the opening 119 in the inner housing and through the "+" opening 109 in the cover 105b to allow for a user to interact with the activator stylus 121. As can be appreciated, the "+" shaped opening defines the direction of travel of the selector stick 121. The "+"-shaped slot allows for travel of the activator stylus in four directions (up, down, left, right) along the two axes 102 and 104. The housing 105 can be provided with selectable gates which close off one or more arms of the slots of the "+"-shaped opening, to limit the travel of the activator 121 stick to 1, 2 or 3 directions.

The activator stylus 121 comprises a stem 122 with a base plate 123 at the bottom thereof. The activator stylus 121 is of a length such that the base plate 123 of the activator stylus 121 is below the flange 107c of the inner housing member 107. As can be appreciated, the base plate 123 thus prevents the activator stylus from being pulled upwardly relative to the inner housing 107 and the main housing 105. The base plate 123 is preferably circular (corresponding to the shape of the inner surface of inner housing wall 107a), and has a diameter slightly smaller than the inner diameter of the inner housing wall 107a. A shaft 125 passes through the base plate 123 and extends into the opposed elongate slots in the inner housing wall 107a. The shaft 125 is preferably aligned with one of the one of the cross-slots of the +-shaped opening 109 in the housing cover 105b.

The base plate 123 rests on, or preferably is coupled to, a biasing member, such as a spring 127, which in turn rests on a spring support 129 that rests on a baseplate 131 that closes the housing 105 at the bottom thereof. The biasing member 110 is preferably a coil spring, and more preferably, a flat coil spring. The housing baseplate 131 is secured to the bottom of the housing by, for example, screws 133 which pass through the housing baseplate 131, the spring support 127, and into the wall 107a of the inner housing 107. As can be appreciated, the spring 127, the spring support 129, the base plate 131, and the activator stylus 121 comprise inner components of the switch 100. A screw 134 passes through the housing 105 into the spring support 129 to maintain the rotational alignment of the alignment of the inner components with the housing 105 and to secure the cover to the inner components. Any other desired means can be used to secure the inner components (and particularly the inner housing 107 and spring support 129) in the housing 105. For example, the spring support and/or the inner housing could be provided with elements (such as spring biased balls) that snappingly engage corresponding elements (such as a bore) in the housing 105 to provide for a snap connection.

The spring support 129 comprises an upper surface 129a which is spaced above the housing baseplate 131 and on which the spring 127 rests. The spring 127 biases the activator stylus 121 upwardly, such that the activator stylus base plate 123 is urged against the inner housing flange or shoulder 107c. In addition, the spring biases the activator stylus 121 to a center position (e.g., as shown in FIG. 1) in which the activator stylus extends through the center of the +-shaped opening 109 in the housing cover 105b. The use of the spring 127 and the pivot shaft 125 extending into the elongate slots 117 allows for the activator stylus 121 to be pivoted about two axes. Firstly, the activator stylus 121 can pivot about the pivot shaft 125, and thus pivot about a first axis that is defined by the pivot shaft 125. Secondly, the activator stylus 121 can pivot about a second axis perpendicular to the first axis. In this direction, as the activator stylus 121 is moved along this second axis, the shaft 125 will pivot in the elongate slots 117 to move from a generally horizontal position (as seen in FIG. 3 when the selector switch is in a normal position) to a canted position (not shown). Regardless of the axis in which the activator stylus 121 is moved (e.g., forward, backward, left, or right), the side of the spring 127 in the direction of the movement is compressed and the side of the spring 127 opposite the movement is placed in tension. Thus, when the force moving the activator stylus 121 is removed, the compression and tension in the spring 127 re-centers the activator stylus 121 and the spring 127 returns to its normal state. The spring 127 also opposes vertical motion (into and out of the housing 108) of the activator stylus 121.

The activator stylus base plate 123 has a rounded bottom 123a (e.g., a partially spherical/radiused edge) that facilitates the interaction with and operation of the spring 127. For example, the rounded bottom 123a allows for the spring 127 to be preloaded such that as the activator stylus 121 is placed within the housing 107 the rounded bottom 123a compresses and/or spreads laterally at least one turn of the spring 127. By preloading the spring 127 such that the spring 127 is in compression in its normal state (e.g., absent an input on the activator stylus 121), the activator stylus 121 resists input force constantly and linearly throughout its movement. This provides an improved tactile feel for a user of the toggle selector switch 100.

The baseplate 131 provides for mounting of the toggle selector switch 100 and includes a plurality of pins 135 providing for an electrical connection between the toggle selector switch 100 and other equipment (e.g., a computer, a data acquisition unit, or other equipment configured to receive an input signal from the toggle selector switch 100).

To register an input provided by a user interacting with the activator stylus 121, the toggle selector switch 100 includes a plurality of pushbutton switches 137 which are received in the depressions 111 of the inner housing wall 107a. The activator stylus 121 includes a striker 139 positioned on the stem 122 to be aligned with the approximate vertical center of the switches 137 so as to engage a pushbutton switch 137 when the activator switch is pivoted along one of its axis to activate the switch (e.g., by depressing the pushbutton switch 118). The striker 139 is preferably in the form of a circular disc which extends generally perpendicularly from the stem 122. Each pushbutton switch 137 corresponds to a possible input. The toggle selector switch 100 is shown to include four pushbutton switches 137 to provide for four possible inputs along two axes 102, 104. Each pushbutton switch 137 is arranged radially about a central axis coaxial with the resting position of the activator stylus 121. Each pushbutton switch 137 is arranged about the central axis with ninety degrees of separation. Lines drawn through the centers of the four pushbutton switches 137 define a "+" that is aligned with the "+"-shaped opening 109 in the housing cover 105b.

Each pushbutton switch 137 is also spaced from the central axis. The spacing provides for some movement of the activator stylus 121 that does not trigger a pushbutton 137 and therefore no signal is sent from the toggle selector switch 100. The pushbutton switches 137 may be moved closer to or further from the central axis in order to tune this dead zone to match the equipment that is being simulated. The distance between the pushbutton switches 137 may be adjusted by changing the geometry of the components of the switch itself rather than moving the location of the switch. Likewise, the geometry of the components of the pushbutton switch 137 may be modified to affect other properties of the toggle 100 as a whole. The pushbutton switch 137 may be modified to adjust the force required to activate the toggle selector switch 100 such that a selection signal is output.

Figure 6:
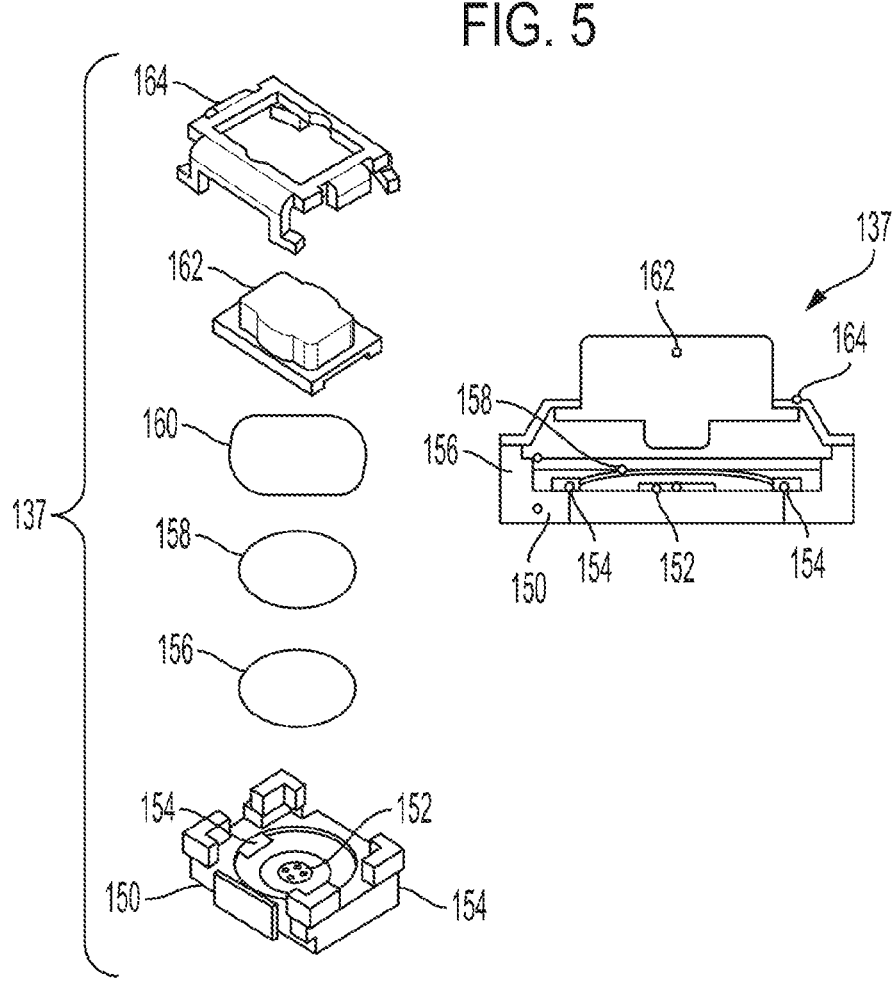
FIG. 6 is partial schematic and exploded view of a pushbutton switch of the type used in the toggle switch.

Referring now to FIG. 6, each pushbutton switch 137 is configured to be modifiable to adjust the properties of the pushbutton switch 137 and the toggle 100. Each pushbutton switch 137 includes a mounting base 150. The mounting base 150 is fixed when attached to the toggle 100. The mounting base 150 includes a contact 152 that is selectively connected to a power source 154 such that a signal is sent when the contact 152 and the power source 154 are electrically connected.

To selectively connect the contact 152 to the power source 154 such that a circuit is formed and a signal is output from the pushbutton switch 137, the pushbutton switch 137 includes at least one electrically conductive dome 156, 158. The electrically conductive dome(s) is(are) coupled to the power source 154. The electrically conductive dome(s) is(are) adapted and configured to flex under a force applied by the striker 139 of the activator stylus 121. When sufficiently flexed, the electrically conductive dome touches/engages the contact 152 and a circuit is completed. When the applied force is removed, the electrically conductive dome returns to its normal position and the circuit is broken.

As shown in FIG. 6, each pushbutton switch 137 includes a first electrically conductive dome 156 and, optionally, a second electrically conductive dome 158. The use of two electrically conductive domes 156, 158 in the pushbutton switches 137 allows for the toggle 100 to be tailored to specific uses. For example, the use of both the first and second conductive domes 156, 158, in contrast to just a single conductive dome, requires a greater force to complete/close a circuit and output a signal corresponding to a selection input made by a user through the activation stick 121. Using two conductive domes 156, 158 is an advantageous way to increase the force required to provide an input using the toggle because adding a second conductive dome 158 does not require machining or other modification to the hardware of the selector switch 100. In contrast, replacing a single conductive dome 156 or 158 using a less flexible conductive dome may require manufacturing a new conductive dome having a greater thickness. Such designing and manufacturing of a new component is expensive and time consuming. Furthermore, using two conductive domes 156, 158 provides, in some instances, for a different tactile feel when actuating the toggle. Two conductive domes 156, 158 used in combination may act as a compound spring. The two domes 156, 158 may be in substantial contact with one another or may be spaced apart from one another. The greater number of configurations allowed by two or more conductive domes 156, 158 and the resulting changes in behavior and feel when using the toggle allow for the toggle to more easily approximate the controls of one or more systems which are being simulated. In some embodiments, the second conductive dome 158 does not form an electrical connection with the contact when flexed under the applied force. Rather, the second conductive dome 158 is used only to adjust the tactile feel of the toggle. The second conductive dome 158 can be separated from the first electrically conductive dome 156 by an insulating film.

Each pushbutton switch 137 may optionally include one or more additional components. The pushbutton switch 137 may include a non-conductive and flexible film 160. The film 160 is positioned adjacent the outermost electrically conductive dome 156, 158 and is adapted and configured to insulate the conductive dome 156, 158 from the activator stylus 121. Thus, the film 160 prevents inadvertently forming a circuit with the power source 154. Each pushbutton switch 137 may also include a push plate 162. The push plate 162 provides a point for the striker 137 of the activator stylus 121 to interact with the pushbutton switch 137. For example, when a user makes a selection with the activator stylus 121, the activator stylus contacts and displaces the push plate 162 which in turn pushes and displaces the film 160 and flexes the electrically conductive dome(s) 156, 158. The first electrically conductive dome comes into contact with the contact 152 forming a circuit between the contact 152 and the power source 154. The pushbutton switch 137 also includes a cover 164 that secures one or more components to the mounting base 120.

In some embodiments, each pushbutton switch 137 further includes a distinct printed circuit board (PCB). The PCB may be integrated with or be the mounting base 150 of the switch. The PCB may alternatively be coupled to the mounting base 150. The PCB is adapted and configured such that when a circuit is completed by the first electrically conductive dome 156 and the contact 152, the PCB outputs a signal corresponding to the activator stylus 121 being used to make a selection associated with the position of that particular pushbutton switch 137.

In some embodiments, each pushbutton switch 137 is adapted and configured such that one or more electrically conductive domes 156, 158 may be added or removed from the push button switch 137. For example, the cover 164 may be removable such that conductive domes 156, 158 may be added or removed from the push button switch 137 and the cover 164 replaced. The cover 164 may be snap fit to the mounting base 150 or otherwise securable and removable. The conductive domes 156, 158 may also snap fit into the mounting base 150 such that the conductive dome 156 is in contact with the power source 154. In alternative embodiments, the conductive dome 156 is coupled to the mounting base 150 or an adjacent conductive dome 158 by an adhesive. In further alternative embodiments, other mechanisms, fasteners, or the like may be used with the pushbutton switch 137 such that one or more electrically conductive domes 156, 158 may be added or removed from the pushbutton switch 137 to tailor the properties of the toggle selector switch 100 to a particular use. In either case, conductive domes 156, 158 may be added or removed from the pushbutton switch 137 without requiring other modification to the switch 137 or the housing 108 of the toggle selector switch 100.

As noted above, the pushbutton switches 137 are received in the depressions 111 of the inner housing 107 of the toggle selector switch 100. The portion of the switches 137 to be contacted by the striker 137 (i.e., the push plate 162, the film 160, or the conductive domes 156, 158) extend through the opening 113, as seen in FIGS. 3 and 4) to be engaged by the striker 137.

Referring again to FIG. 6, in some embodiments the conductive domes 156, 158 are dome shaped having a circular footprint. The dome shape and the construction of the electrically conductive domes 156, 158 facilitates the flex and rebound of the electrically conductive dome. The electrically conductive dome 156, 128 is constructed of a conductive material such as copper, brass, tin, stainless steel, or other metal or alloy.

Figure 7:
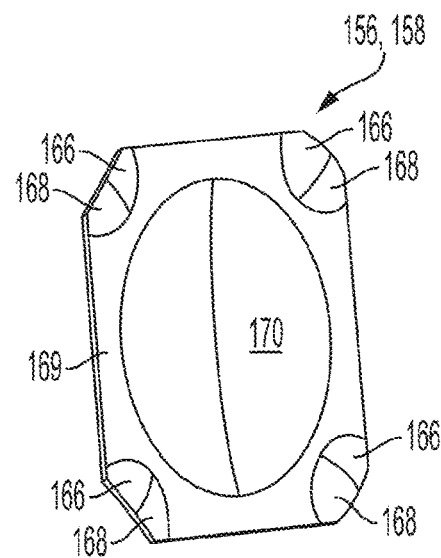
FIG. 7 is a perspective view of an electrically conductive dome of a push button switch.

Referring now to FIG. 7, a detailed perspective view of an illustrative embodiment of the electrically conductive dome 156, 158 is shown. In this embodiment, the electrically conductive dome 156, 158 has a generally square footprint with four chamfered edges 166 at the corners. Each chamfered edge 166 is formed in part by a concave half-dome 168. The concave half-domes 168 form legs that allow for the electrically conductive dome 156, 158 to be positioned above the mounting base 150 and contact 152. The legs formed by the concave half-domes 168 also contact the power source 154 contacts of the mounting base 150. The legs may also function to fit the electrically conductive dome 156, 158 to the mounting base 150 such that the two are coupled together (e.g., a snap-in fit).

The chamfered edges 166 are spaced radially from a central dome 170 by a flat base 169. The central dome 170 is convex and extends above the contact 152 of the pushbutton switch 137. The central dome 170 is configured to flex under an applied force from the activator stylus 121. For example, and without limitation, the central dome 170 and/or other portions of the electrically conductive dome 156, 158 have a thickness permitting the electrically conductive dome 156, 158 to flex or otherwise elastically deform and return to its normal position. The central dome 170 may distort from a normally convex position to a concave position in which the electrically conductive dome 156, 158 engages the contact 152 of the pushbutton switch 137. Without an applied force, the central dome 170 returns to its normal convex position.

Figure 8:
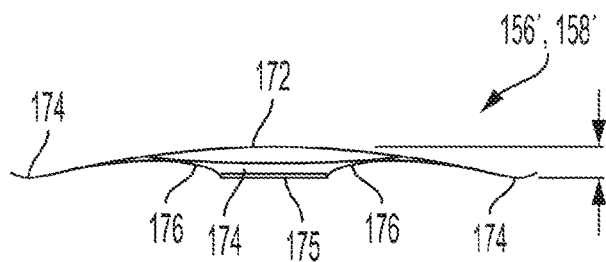
FIG. 8 is an elevational view of an electrically conductive dome according to a second embodiment.
Figure 9:
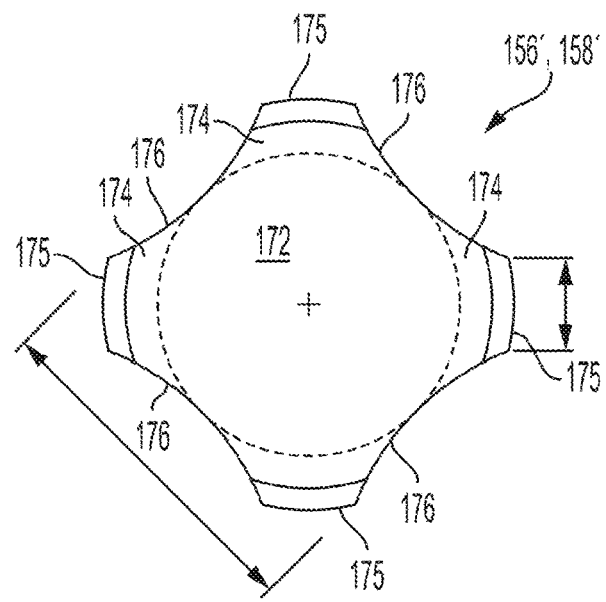
FIG. 9 is a top plan view of the electrically conductive dome of FIG. 8.

Referring now to FIGS. 8-9, another embodiment of electrically conductive domes 156',158' is shown. As a whole, the electrically conductive domes 156',158' are semi-spherical with a curved profile in cross section (e.g., as shown in FIG. 8). The electrically conductive dome 156', 158' has a circular main body portion 172. Four legs 174 extend radially from the circular main body portion 172 and are spaced ninety degrees from one another. Each leg 174 has an arced outer edge 175 and radiused sides 176. As seen, the radiused side 176 of one leg 174 flows into the radiused side 176 of the adjacent leg 174. In a preferred embodiment, the electrically conductive domes 156',158' can have the dimensions shown in FIGS. 8-9. However, the electrically conductive domes 156',158' can have any desired dimension.

Figure 10A:
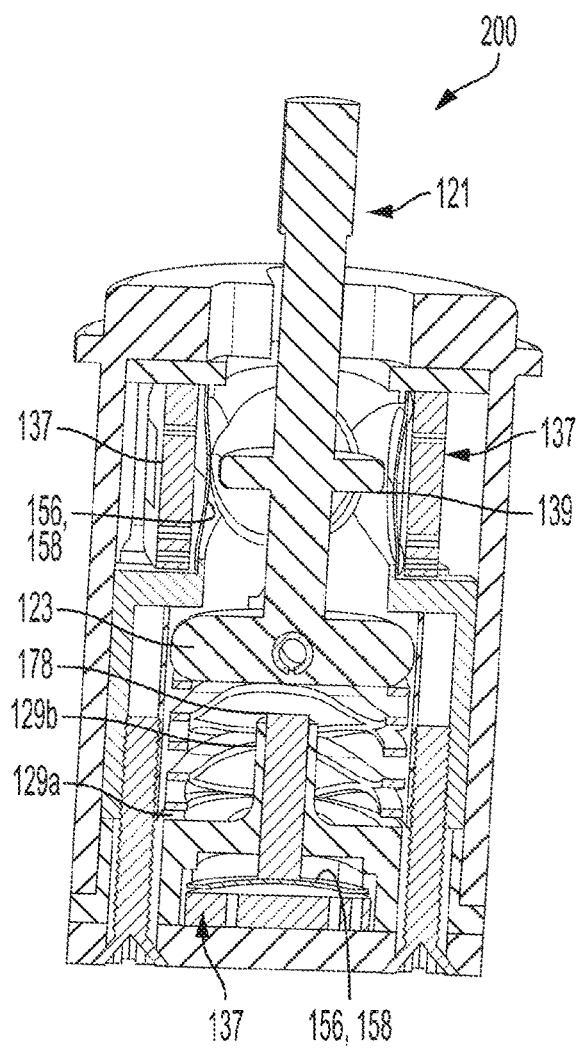
FIGS. 10A and 10B are cross-sectional views of a variation of the toggle switch taken at 90 degrees relative to each other.
Figure 10B:
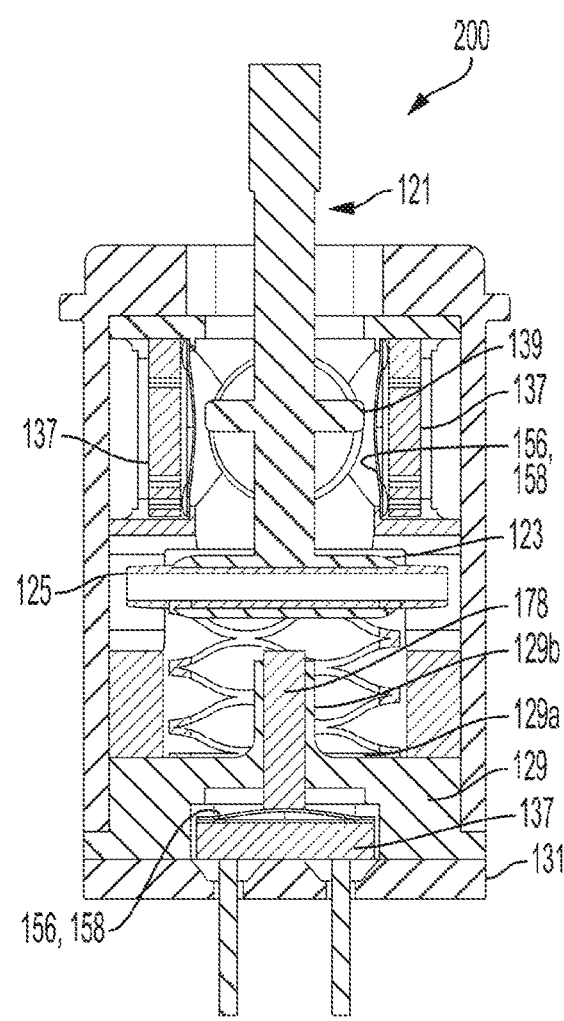

Referring now to FIGS. 10A,B, a variation of the toggle selector switch is shown in which the toggle selector switch 200 has a fifth pushbutton switch 137 that is activated in response to the activator stylus 121 being depressed (e.g., towards the baseplate 112). The overall construction of the selector switch 200 is identical to the selector switch 100. Thus, the selector switch 200 will not be described in detail. Only the aspects which enable the use of the fifth pushbutton switch 137 will be described. In the selector switch 200, the fifth pushbutton switch 137 is positioned on the housing base plate 131 below the surface 129a of the spring support 129. The spring support 129 further includes a hollow neck 129b extending upwardly from surface 129a. A plunger 178 rests on the contact surface of the fifth push button switch 137 and extends upwardly out of the neck 129b. The plunger 178 is urged upwardly by the spring force of the switch dome. The top of the plunger is below the base plate 123 of the activator 121, but is sufficiently long, such that the top of the plunger is above the bottom of the elongate slots 117 of the inner housing side wall 107a. Thus, when the activator stylus 121 is depressed, the base plate 127 will engage the plunger 178 and push the plunger 178 downwardly, causing the fifth pushbutton switch 137 to be activated. As noted, the plunger, in the normal position, does not contact the bottom of the base plate 123. Thus, the activator stylus 121 does not immediately interact with the plunger 178 when depressed in order to reduce the chance of a user inadvertently providing a selection input corresponding with the fifth pushbutton switch 137. As can be appreciated, the elongate slots 117 define the path of travel of the activator stylus 121, and thus prevent the activator stylus from being pressed too far.

When the plunger 178 is sufficiently depressed by an input through the activator stylus 121, the plunger 178 is depressed such that the plunger 178 flexes the electrically conductive domes 156, 158 such that at least one electrically conductive dome 126 contacts the contact 122. This completes a circuit between the contact 122 and the first electrically conductive dome 156 resulting in the fifth pushbutton switch 118 outputting a signal indicating that the activator stylus 121 has been depressed. The toggle selector switch 200 thus outputs a signal indicating that a user has made a selection using the toggle selector switch 200.

The activator switch 100, 200 and the pushbutton switches 137 are configured such that a user can manipulate the activator stylus 121 in one of four directions or five directions, respectively, corresponding to each pushbutton switch 137 such that a circuit is completed between the contact 152 and the first electrically conductive dome 156 of the pushbutton switch 137. The pushbutton switch 137 outputs a signal indicating that the activator stylus 121 has been moved in a selected direction.

The pushbutton switch 137 is able to stimulate the tactile feel and linear arc movement of current switches, without the use of springs and mechanized hardware to stimulate tactical snap feel when over centering happens. Additionally, the ability to stack the switch domes allow for stiffer snaps which may be necessary to satisfy specific requirements without the need to modify hardware. Modifying the pushbutton switches 137 includes accessing the pushbutton switches of the toggle selector switch 100, 200. To access the pushbutton switches 137, the housing 105 is removed from the inner housing. The pushbutton switches will then be exposed, and the dome of the switches 137 can be modified as desired, and then replaced. Once the pushbutton switches 118 are modified, the housing 105 is replaced and secured in place.

Advantageously, the above described methods provide for modification of a toggle selector switch 100, 200 without requiring modification to the inner housing 107, the spring 127, the spring support 129, the activator stylus 121, or the baseplate 131. Similarly, no machining of any of the parts is required to modify the toggle 100, 200 in order to tailor the toggle 100, 200 to specific uses (e.g., in simulating the characteristics of particular flight controls).

Changes can be made in the above constructions without departing from the scope of the disclosure. It is intended that all matter contained in the above description or shown in the accompanying drawings shall be interpreted as illustrative and not in a limiting sense. For example, the elongate slot 117 which receives the pivot shaft 127 could be formed in the inner surface of the housing wall 105*a*. Similarly, the depressions 111 which receive the pushbutton switches 137 could be formed in the inner surface of the housing wall 105*a*. This could allow for elimination of the inner housing 107. These examples are merely illustrative.

We claim:

1. A toggle selector switch comprising:
a housing having a top surface and a side wall;
an activator stylus mounted in said housing to be pivotable about at least one axis, said stylus comprising an elongate stem, a base plate at a bottom end of said stem and a striker extending generally perpendicularly from the stem;
at least one pushbutton switch mounted in said housing; said pushbutton switch being positioned axially in said housing to be engaged by said striker when said elongate activator stylus is pivoted;
a biasing member supported in said housing; said base plate of said stem engaging said biasing member; whereby said biasing member will center the activator stylus on a central axis when a force applied to the stylus is removed;
said at least one pushbutton switch comprising:
a mounting base including a contact; and
a first electrically conductive dome coupled to the mounting base and positioned above the contact, the first electrically conductive dome being normally spaced from the contact, the first electrically conductive dome being adapted and configured to flex under an applied force and to then touch the contact to complete a circuit and to return when the force is withdrawn;
wherein, the activator stylus and the at least one pushbutton switch are adapted and configured such that a user can manipulate the activator stylus and depress the first conductive dome of the at least one pushbutton switch such that a circuit is completed between the contact and the first electrically conductive dome of the pushbutton switch and the pushbutton switch outputs a signal indicating that the activator stylus has been moved in the one of four directions.

2. The toggle selector switch of claim 1 further comprising an internal housing in which said stylus is mounted; said internal housing comprising a wall having at least one depression formed on an outer surface thereof; said at least one pushbutton switch being sized to be received in said at least one depression.

3. The toggle selector switch of claim 2 wherein said housing is removable from said internal housing, whereby said at least one pushbutton switch can be accessed for modification or replacement.

4. The toggle selector switch of claim 1 wherein said at least one axis comprises a first axis and a second axis, and wherein said at least one push button switch comprises four push button switches.

5. The toggle selector switch of claim 4 wherein including a pivot shaft defining a first axis; said toggle selector switch further comprising opposed elongate slots formed in a wall of said housing; said pivot shaft being sized to be received in said elongate slots; whereby said elongate slots define a path of travel for said pivot shaft, said second axis being generally perpendicular to said pivot shaft.

6. The toggle selector switch of claim 1 further comprising a bottom pushbutton switch; said bottom push button switch being positioned below said activator stylus to be activated by pushing said activator stylus downwardly.

7. The toggle selector switch of claim 6, further comprising a vertically movable plunger resting on the bottom pushbutton switch; the plunger being sized to be engaged by stylus when depressed.

8. The toggle selector switch of claim 1 wherein the at least one pushbutton switch further comprises a second electrically conductive dome positioned adjacent the first electrically conductive dome, the second electrically conductive dome being adapted and configured to flex under an applied force and to return when the force is withdrawn.

9. The toggle selector switch of claim 1, wherein the first electrically conductive dome comprises a circular main body portion and four legs positioned radially about the main body portion radially and spaced ninety degrees from each other.

10. The toggle selector switch of claim 9, wherein each leg of said dome comprises an outer edge, said outer edge preferably being arced.

11. The toggle selector switch of claim 10, wherein each leg of the four legs of said dome have radiused sides.

12. The toggle selector switch of claim 1, wherein said at least one pushbutton switch further comprises a non-conductive and flexible film adjacent the electrically conductive dome and adapted and configured to insulate the electrically conductive dome from the activator stylus.

13. The toggle selector switch of claim 1, wherein said at least one pushbutton switch comprises a distinct printed circuit board.

14. The toggle selector switch of claim 1, wherein said at least one pushbutton switch is adapted and configured such that one or more electrically conductive domes may be added or removed from the pushbutton switch.

15. The toggle selector switch of claim 14, wherein said at least one pushbutton switch further comprises a cover removably coupled to the mounting base, and wherein the cover is adapted and configured to secure the one or more electrically conductive domes to the mounting base when the cover is coupled to the mounting base.

16. The toggle selector switch of any of claim 15, wherein the electrically conductive dome is coupled to the mounting base or an adjacent electrically conductive dome by an adhesive.

17. A toggle selector switch comprising:
a housing having a top surface and a side wall;
an activator stylus mounted in said housing to be pivotable about at least one axis, said stylus comprising an elongate stem, a base plate at a bottom end of said stem and a striker extending generally perpendicularly from the stem;
at least one pushbutton switch mounted in said housing; said pushbutton switch being positioned axially in said housing to be engaged by said striker when said elongate activator stylus is pivoted;
a biasing member supported in said housing; said base plate of said stem engaging said biasing member; whereby said biasing member will center the activator stylus on a central axis when a force applied to the stylus is removed;
said at least one pushbutton switch comprising:
a mounting base including a contact;
a first electrically conductive dome coupled to the mounting base and positioned above the contact, the first electrically conductive dome being normally spaced from the contact, the first electrically conductive dome being adapted and configured to flex under an applied force and to then touch the contact to complete a circuit and to return when the force is withdrawn; and
a second electrically conductive dome positioned above the first electrically conductive dome, the second electrically conductive dome adapted and configured to increase the force required to bring the first electrically conductive dome into contact with the contact,
wherein, the activator stylus and the at least one pushbutton switch are adapted and configured such that a user can manipulate the activator stylus and depress the first conductive dome of the at least one pushbutton switch such that a circuit is completed between the contact and the first electrically conductive dome of the pushbutton switch and the pushbutton switch outputs a signal indicating that the activator stylus has been moved in the one of four directions.

18. The pushbutton switch of claim 17, wherein the first electrically conductive dome comprises a circular main body portion and four legs positioned radially about the main body portion radially and spaced ninety degrees from each other.

19. The pushbutton switch of claim 18, wherein each leg of said dome comprises an outer edge, said outer edge preferably being arced.

20. The pushbutton switch of claim 17, wherein the second electrically conductive dome does not form an electrical connection with the contact when flexed under the applied force.

* * * * *